(12) United States Patent
Kugelstadt

(10) Patent No.: US 7,196,309 B2
(45) Date of Patent: Mar. 27, 2007

(54) PHOTODETECTION CIRCUIT

(75) Inventor: Thomas Kugelstadt, Rushden (GB)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/817,578

(22) Filed: Apr. 2, 2004

(65) Prior Publication Data
US 2005/0035275 A1 Feb. 17, 2005

(51) Int. Cl.
H04B 10/00 (2006.01)

(52) U.S. Cl. .................. 250/214 R; 398/202

(58) Field of Classification Search ........... 250/214 R, 250/214 AG, 214.1; 398/202–214; 361/94
See application file for complete search history.

(56) References Cited

U.S. PATENT DOCUMENTS

| 3,560,755 A | * | 2/1971 | Blaise | 250/214 R |
| 5,311,451 A | * | 5/1994 | Barrett | 700/278 |
| 6,535,157 B1 | * | 3/2003 | Garrity | 341/163 |
| 6,643,472 B1 | * | 11/2003 | Sakamoto et al. | 398/202 |

OTHER PUBLICATIONS

Schlumberger, "Photodetector Device, Especially for Reflectometers", (FR2658605), Aug. 23, 1991, EPO abstract and p. 2, Line 14-p. 4, line 24.
Nippon Electric Co, "Optical Reception Circuit", (JP3126335), May 29, 1991, PAJ Abstract; fig 1 and fig 2.
Fufitsu Ltd., "Photo Receiver Circuit", (JP55064452), May 15, 1980, PAJ abstract and fig 1.

* cited by examiner

*Primary Examiner*—Thanh X. Luu
*Assistant Examiner*—Tony Ko
(74) *Attorney, Agent, or Firm*—Warren L. Franz; W. James Brady; Frederick J. Telecky, Jr.

(57) ABSTRACT

In a photo detection arrangement, the current through a detector 10 is sensed by a series resistor Rs and amplified and amplified at 21. The output of the amplifier is compared with a reference voltage 23, which is chosen to correspond to an overload input applied to the detector. When the comparator 22 triggers, a latch 24 is set, which controls a switch 25 to remove the supply voltage to the detector applied to the detector by power amplifier 14. In this way, protection is afforded to the detector 10 without recourse to a high value series resistor. Moreover, the latch provides an output to demonstrate that an overload has occurred.

8 Claims, 1 Drawing Sheet

PHOTODETECTION CIRCUIT

RELATED APPLICATION

The present application is based on priority of British Patent Application No. 0307721.1, filed on Apr. 3, 2003.

BACKGROUND OF THE INVENTION

Sensitive photodetectors can be easily damaged through short, high intensity light pulses, which are above the specified maximum intensity of the photo detector, thus presenting an optical overload condition. Often the effects of such damage become apparent through device malfunctions, which could occur months or even years later. The lack of proof that an overload ever occurred can lead to disputes between OEMs and customers since it is not possible to rule out the possibility of an overload in failed equipment. Generally, it is problematic that it is impossible to tell that reliable detector operation may have been compromised.

The avalanche photo diode (APD) exhibits gain values up to 100 and is therefore able to detect levels at −35 dBm (=0.3 μW). However, until recently PIN diodes have been the preferred photo detector in networking applications because of their low noise sensitivity, despite requiring a preamplifier if acceptable small signal performance is to be achieved. Through ever improving APD small signal performance, even the need for an optical amplifier may be removed, leading to a dramatic reduction in the cost of optical networking equipment.

Hence, now that APDs having improved signal to noise ratios have been developed, they are becoming preferred to the PIN diode with preamp combination. Devices integrated together with output conditioning amplifiers and thermisters for temperature compensation are available.

In use, the APD must be fed from a source of supply voltage from a control circuit which is able to supply a stable supply voltage. Moreover, because the avalanche mechanism within the device is dependent upon its reverse bias voltage, the actual voltage across the device must be kept substantially constant for accurate input level sensing and must be additionally regulated to compensate for temperature effects since the avalanche mechanism is temperature dependent also.

APDs can be damaged or destroyed through high current flow caused by strong incident light. The duration of this type of damaging optical overload condition can be as short as microseconds. In the case of a short over load condition, the APD might well be able to continue operation once normal conditions have been restored; however, it's potentially damaged internal structure remains a reliability issue.

Since an APD intended for optical networking equipment is a high value component in itself and moreover may be very expensive to replace in the field, it is necessary to have some protection built into detection circuitry.

In the prior art a common solution is to place a high impedance resistor in series with the APD (as may be seen for example in FIG. 1).

In FIG. 1, there is shown the supply portion of a typical control circuit for an APD photodetector 10. The photodetector 10 is fabricated as part of an integrated device 12, together with an output amplifier 11. The integrated device, 12 will typically include a thermister (not shown) to sense the temperature of the device, such that temperature variations may be compensated by a further portion of the circuit, which is not shown in the figure. Detector 10 receives input light from a fiberoptic 16. The detector is supplied with a voltage from power amplifier 14 which is stabilized by a feedback resistor network Rf, Rg. Since there are typically wide variations in individual APD performances, the equipment is typically individually calibrated and one way to do this is to drive the power amplifier by a digital to analog converter 15, which may be set to give the required multiplication factor from the individual diode present in the integrated package 12 by controlling the actual reverse bias voltage applied. Photodiode 10 is protected by the inclusion of a series resistor Rs.

The operating current of the APD is typically between 1 and IOμA. In the case of a 100 k series resistor, the voltage drop across this resistor might be approximately for example 0.3V. During an optical overload condition however, the current can ramp up to 0.5 mA for a short period, causing the voltage across Rs to rise to several tens of volts, reducing the bias voltage across the APD and minimizing its power dissipation and thus affording some protection to the detector 10. Once the overload condition disappears, the current would return to its normal operating value.

Although offering protection, this arrangement itself has some drawbacks. It is not possible from the circuit to tell that an overload event has occurred and obviously not its magnitude or duration. This being the case, the reliability issue of a potentially damaged device remaining in service is still present.

Moreover, the protection is provided at the expense of circuit performance and complexity. Since the gain factor (M) depends on the reverse bias voltage of the APD, the voltage drop across the series resistor, Rs, will itself cause the actual gain factor to differ from the intended value. Even quite small variations in bias can cause significant amplification factor variations and the higher value of Rs the greater will be the voltage drop affecting the amplification delivered. Unfortunately, in order to achieve adequate protection, the value of Rs has to be sufficiently high that the variation in amplification factor caused by the voltage drop across it requires compensation of the detector output, requiring that DAC 15 be driven hard.

BRIEF SUMMARY OF THE INVENTION

The present invention provides a detection arrangement which does not exhibit the above drawbacks, and in particular a photodection arrangement including a photo detector;

supply circuitry for biasing the detector into incident light sensitive conduction;

a current sensing element in said supply circuitry to sense detector current, said element being selected such that its value is sufficiently low not to contribute a bias disruptive voltage drop due to said conduction of said detector;

a circuit for comparing said sensed current with a reference value; and a circuit for removing said bias when said a reference value is exceeded, said a reference value being selected such that it represents onset of an overload of said detector.

Advantageously, the circuit for comparing comprises a comparator feeding a latch which is triggered upon an overload being applied to the detector. Moreover, the latch may control a switch which acts to disconnect or remove said supply to said detector.

Since the detector is protected by other means, the sense element may be a low value series resistor of a value too low to afford detector protection for example of the order of 500 ohms.

Preferably, the arrangement includes a microcontroller arranged to control the supply circuitry. The micro controller may be arranged to receive an interrupt upon the onset of overload and the to enter a wait routine to provide a delay before controlling the arrangement to resume normal operation for example by resetting the latch after said delay.

Advantageously, the microcontroller may monitor detector output and determine a suitable delay based upon logged values before the onset of overload.

BRIEF DESCRIPTION OF THE DRAWINGS

In order that features and advantages of the present invention maybe further appreciated, any exemplary embodiment will now be described reference to the accompanying diagrammatic drawings of which.

DETAILED DESCRIPTION OF THE INVENTION

Figure 1:
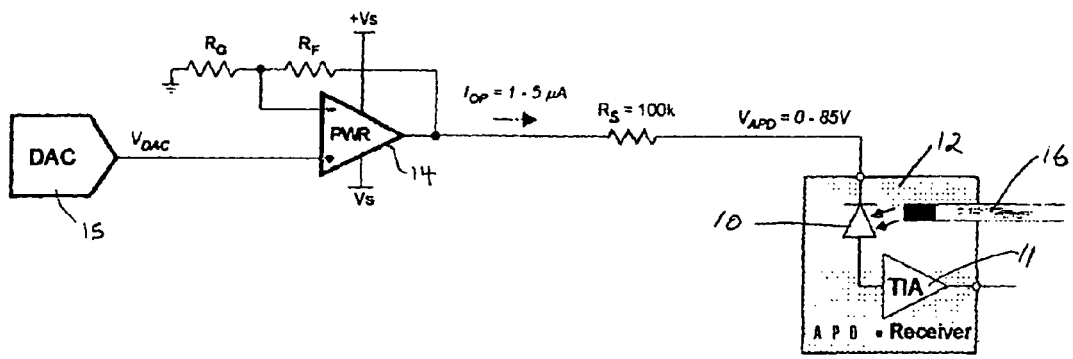
FIG. 1 represents a prior art photodetector protection arrangement.
Figure 2:
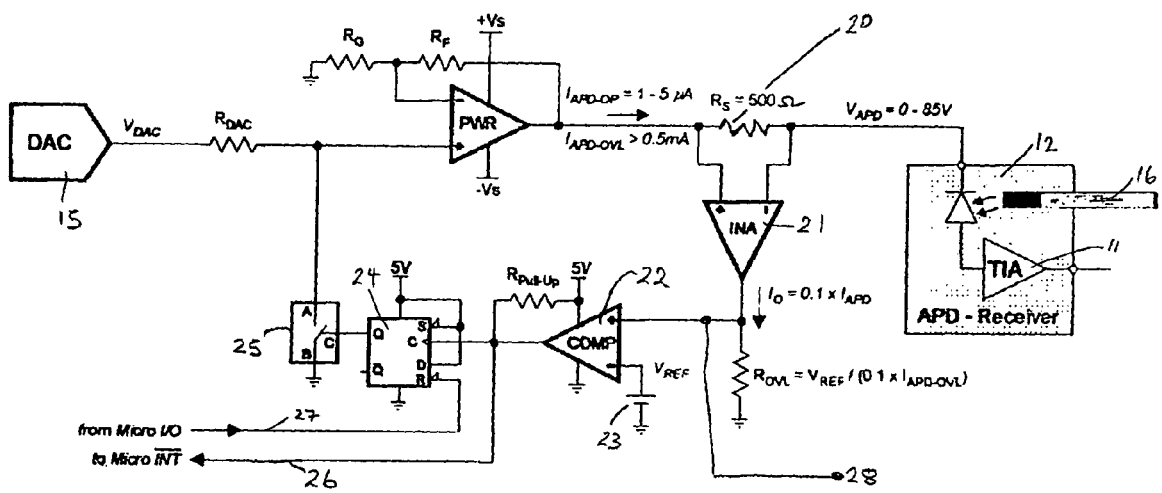
FIG. 2 represents an arrangement in accordance with the present invention.

FIG. 2 shows a photodetection arrangement in accordance with an embodiment of the present invention. An APD detector 10 in an integrated package 12 is fed from a power amplifier the output of which is determined by a digital to analog converter 50 which is set to provide the required supply for the particular APD in the use.

The current through the APD is sensed by across series resistor 20 by an instrumentation amplifier 21, which provides an output 28 proportional to the current through the detector 10 and therefore indicative of the light incident via fiberoptic 16.

The output of the amplifier is connected to a comparator 22, the other input of which is fed by a reference voltage 23. The comparator output feeds the clock input of a D-type flip-flop 24, which will trigger when the output of the instrumentation amplifier exceeds the reference voltage supplied to the comparator. The output of the flip-flop controls an analogue switch 25 which pulls down the input to the power amplifier supplying the detector 10. When this switch is closed, the supply to the detector will be removed, effectively switching it off and thereby rendering it insensitive to any input at fiberoptic 16 and in particular to any overload input level that would have caused damage to the device 10 had it remained biased into operation by the power amplifier 14.

In the embodiment of FIG. 2, the circuit senses the photo detector current and compares its value with the predetermined reference value. In the case of an overload condition, the photo current exceeds this reference value, causing the output of the comparator to change. The comparator triggers a Latch (D-Flip-Flop), which stores the overload event and also causes an interrupt of the system-controller (for example a programmed micro-controller, not shown) via an interrupt line 26, which stores the overload condition. The output of the latch now activates switch 25 to switch the power supply to the detector off to protect the APD. The system-controller can reset the latch via a line 27 connected to the rest input of the flip flop to allow for normal system operation after the external failure or overload input is removed.

It will be appreciated that the series sense resistor Rs of the embodiment of FIG. 2 has a low value (for example 500 ohms) compared to the protection resistor of the prior art and may of itself have a value too low to afford device protection.

At typical operating currents of 1 µA to 5 µA the voltage drop across Rss yields 2.5 mV maximum, and has the great advantage that it does not contribute to a significant change in gain factor of the APD. Hence the need for any compensation is removed.

In the case of an overload condition, (for example 0.5 mA through the APD), the instrumentation amplifier, INA, converts the voltage across Rs into an output current which is for example one tenth of the APD current.

The resistor Rovl is so calculated, that at the specified maximum APD current of 0.5 mA, its voltage drop becomes equal to or larger than the comparator reference voltage, VREF. The comparator output changes from low to high, thus generating a positive edge trigger for the following D-type flip-flop. The high-level at the D-input is now latched to the Q-output of the flipflop, while the Set (S) and Reset (R) inputs are kept inactive.

The high Q-output closes the analog-switch between contacts A and B, thus connecting RDAC to ground. The output of the power amplifier drops to zero volts and the APD current ceases to flow. The voltage at ROVL drops to zero and the comparator output changes from high to low. This negative transition now triggers one of the low-active interrupt-inputs 26 of the micro controller.

An interrupt service routine of the micro-controller may now set off an external alarm as well as storing the fault event within the controller's memory. Once the fault condition is removed, the microcontroller may send a low-signal from its I/O via line 27 to the reset pin of the D-Flip Flop to clear the fault condition and to open the switch. From that moment onwards, normal operation of the circuit can proceed.

This arrangement thus overcomes the drawbacks of the prior art:

1) by implementing a feedback loop that latches the over-current condition, and 2) by using a low-impedance resistor, that avoids compensation of the voltage drop at operating currents.

Yet it still provides improved protection for the detector.

In particular, it will be realized that the arrangement provides for the occurrence of an overloaded event to be both established and memorized as well as protecting the detector from that overload without the use of a high-value protection resistor which itself leads to changes in the game factor of the detector in normal operation.

After logging the overload, the system may be put back into normal operation after for example a predetermined time established by a waiting loop run in the microcontroller. If the fault condition were still present, the arrangement would simply switch off again for an additional waiting time. Hence, the arrangement may be configured automatically to reconnect as soon as possible after the fault is cleared. By counting the number of waiting periods, the length that an overloading input was incident may be estimated. If changes in the sensed level at output 28 are converted and logged, they may be examined for activity immediately prior to onset of the fault and a suitable waiting delay may be chosen accordingly.

In service, overload events may be logged and maintenance planned if reliability is thought to have become compromised through excessive device damage exposure.

The apparatus is readily adapted into a test rig for photodetectors that may be characterized both in terms of gain factor and in terms of overload tolerance by allowing preset amounts of overload by altering the trigger point of the comparator.

The invention claimed is:

1. A photodection arrangement including a photo detector;
   supply circuitry for biasing the detector into incident light sensitive conduction;
   a current sensing element in said supply circuitry to sense detector current, said element being selected such that its value is sufficiently low not to contribute a bias disruptive voltage drop due to said conduction of said detector;
   a circuit for comparing said sensed current with a reference value;
   a circuit for removing said bias when said a reference value is exceeded, said a reference value being selected such that it represents onset of an overload of said detector; and
   a comparator feeding a latch which is triggered upon an overload being applied to the detector,
   wherein the latch controls a switch which acts to disconnect or remove said supply to said detector.

2. The arrangement of claim 1, wherein the sense element is a low value series resistor of a value too low to afford detector protection.

3. The apparatus claim 2 wherein value is of the order of 500 ohms.

4. A photodection arrangement including a photo detector;
   supply circuitry for biasing the detector into incident light sensitive conduction;
   a current sensing element in said supply circuitry to sense detector current, said element being selected such that its value is sufficiently low not to contribute a bias disruptive voltage drop due to said conduction of said detector;
   a circuit for comparing said sensed current with a reference value; and
   a circuit for removing said bias when said a reference value is exceeded, said a reference value being selected such that it represents onset of an overload of said detector a comparator feeding a latch which is triggered upon an overload being applied to the detector,
   wherein the latch controls a switch which acts to disconnect or remove said supply to said detector,
   including a microcontroller arranged to control the supply circuitry, said microcontroller arranged to receive an interrupt upon the onset of overload and to enter a wait routine to provide a delay before controlling the arrangement to resume normal operation.

5. The arrangement of claim 4 and wherein the microcontroller is arranged to reset the latch after said delay.

6. The arrangement of claim 4 wherein the microcontroller monitors detector output and determines a suitable delay based upon logged values before the onset of overload.

7. The arrangement of claim 1 configured as test apparatus for a photo detector.

8. The arrangement of claim 1 wherein the detector is an avalanche photo diode.

* * * * *